US008346629B2

(12) United States Patent
Beroukhim et al.

(10) Patent No.: US 8,346,629 B2
(45) Date of Patent: *Jan. 1, 2013

(54) WEBSITE, USER INTERFACES, AND APPLICATIONS FACILITATING IMPROVED MEDIA SEARCH CAPABILITY

(76) Inventors: Joshua Beroukhim, Los Angeles, CA (US); Joseph Michael, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/342,812

(22) Filed: Jan. 3, 2012

(65) Prior Publication Data

US 2012/0246584 A1    Sep. 27, 2012

Related U.S. Application Data

(63) Continuation of application No. 13/053,148, filed on Mar. 21, 2011.

(51) Int. Cl.
*G06Q 30/00* (2012.01)
*G06F 17/30* (2006.01)

(52) U.S. Cl. ....... 705/27.1; 707/706; 707/748; 707/749; 707/750

(58) Field of Classification Search ................. 705/26.1, 705/26.2, 26.3, 26.4, 27.1; 707/706, 748, 707/749, 750, 751
See application file for complete search history.

(56) References Cited

U.S. PATENT DOCUMENTS

| 5,790,426 | A  | * | 8/1998 | Robinson | 702/179 |
|---|---|---|---|---|---|
| 6,041,311 | A  | * | 3/2000 | Chislenko et al. | 705/26.7 |
| 6,978,263 | B2 | * | 12/2005 | Soulanille | 1/1 |
| 7,548,958 | B2 | * | 6/2009 | Martin et al. | 709/217 |
| 7,917,238 | B1 | * | 3/2011 | Lapcevic | 700/94 |
| 2003/0126227 | A1 | * | 7/2003 | Zimmerman et al. | 709/217 |
| 2003/0182827 | A1 | * | 10/2003 | Youngdahl | 40/124.06 |
| 2004/0267735 | A1 | * | 12/2004 | Melham | 707/3 |
| 2005/0004835 | A1 | * | 1/2005 | Roslansky et al. | 705/14 |
| 2005/0102867 | A1 | * | 5/2005 | Youngdahl | 40/124.11 |
| 2007/0130589 | A1 | * | 6/2007 | Davis et al. | 725/62 |
| 2007/0198490 | A1 | * | 8/2007 | Lee | 707/3 |
| 2008/0126303 | A1 | * | 5/2008 | Park et al. | 707/3 |
| 2008/0155634 | A1 | * | 6/2008 | Khedouri et al. | 725/118 |
| 2008/0201323 | A1 | * | 8/2008 | Tuttle et al. | 707/5 |
| 2008/0201367 | A1 | * | 8/2008 | Kim et al. | 707/104.1 |
| 2008/0208692 | A1 | * | 8/2008 | Garaventi et al. | 705/14 |
| 2008/0244033 | A1 | * | 10/2008 | Hook et al. | 709/217 |
| 2009/0077198 | A1 | * | 3/2009 | Larsson et al. | 709/217 |
| 2009/0158196 | A1 | * | 6/2009 | Crystal | 715/780 |
| 2009/0215388 | A1 | * | 8/2009 | Karaoguz et al. | 455/3.06 |

(Continued)

OTHER PUBLICATIONS

Jasco, P., "Searching for Music on the Web," Information Today, vol. 14, No. 5, pp. 46-47, May 1997.*

(Continued)

*Primary Examiner* — Nicholas D Rosen
(74) *Attorney, Agent, or Firm* — Henricks, Slavin & Holmes LLP

(57) ABSTRACT

A method for improving media search capability includes providing a user with access to an interface that allows the user to provide one or more inputs relating to an item of media (such as an audio or video recording of a song or a cover song), performing a media search in response to the one or more inputs, and presenting search results via an interactive display generated depending upon media ratings, wherein one or more of the media ratings is determined from media ratings inputs depending upon one or more metrics associated with sources or providers of the media ratings inputs.

12 Claims, 7 Drawing Sheets

U.S. PATENT DOCUMENTS

2011/0099083 A1* 4/2011 Karpinsky ............... 705/26.25
2012/0023126 A1* 1/2012 Jin et al. ................... 707/769
2012/0150614 A1* 6/2012 Dion et al. ............... 705/14.32

OTHER PUBLICATIONS

Microsoft Press Computer Dictionary, Third Edition, Microsoft Press, Redmond, 1997, p. 370.*
Caulfield, K., "Wilson Phillips Go Your Own Way (3:40)," Billboard, vol. 116, No. 20, p. 36, May 15, 2004.*
Anon., "MSN Launches Preview Release of Music Download Service," PR Newswire, Sep. 2, 2004.*
Baccigalupo, C., et al., "Poolcasting: a Social Web Radio Architecture for Group Customisation," Proceedings of the Third International Conference on Automated Production or Cross Media Content for Multi-Channel Distribution, 2007, pp. 115-122.*

* cited by examiner

WEBSITE, USER INTERFACES, AND APPLICATIONS FACILITATING IMPROVED MEDIA SEARCH CAPABILITY

CROSS-REFERENCE TO RELATED APPLICATIONS

This application is a continuation of U.S. Utility patent application Ser. No. 13/053,148, entitled "Website, user interfaces, and applications facilitating improved media search capability", filed on Mar. 21, 2011, which is hereby incorporated by reference.

TECHNICAL FIELD

The present invention relates generally to locating and accessing items of media and, in particular, methods and technologies for improving media search capability utilizing media ratings determined depending upon metrics or other information associated with sources or providers of the media ratings.

BACKGROUND ART

One of the most popular ways for many people to enjoy music is by remaking or "covering" (e.g., performing or recording) their favorite songs (e.g., previously recorded, released or popular songs of someone else). The act of "covering a song" includes, for example, singing a studio recorded song of an original artist with your own voice. A performance covering a song can also include playing the music of the song being covered with an instrument in addition to singing the renowned song. A song can be covered, for example, by singing the lyrics of the song while listening to a recording of the original song (e.g., an instrumental version of the song, or a recording of the song that does not include the vocals. Some musicians recreate only the soundtrack of the songs, leaving out the words. By way of example, YouTube member alekseyvanin has recreated many popular songs using his electric guitar.

Covers of songs are enjoyed by performers of the songs and their audience alike and are often highly valued and sought after by people who are interested in a specific song. Covers also provide a different style and perspective of people's favorite songs.

The popularity of music covers is evident from the billions of views that covers receive on YouTube and other websites. There are thousands of accounts on YouTube belonging to people who focus solely on covering their favorite songs and sharing them on the internet. (For example, the members tiffanyalvord and miaarose have accounts dedicated solely to sharing covers.)

Thousands of top quality covers are uploaded to YouTube as well as other on-line music outlets. Unfortunately, there often appears to be little rhyme or reason to the presentation of search results. For example, when searching for a cover on YouTube, it is often difficult to differentiate between the covers listed in the search results and time consuming as well to find the best covers. For example, when searching "celine dion my heart will go on cover" in the YouTube search bar, 5,680 search results will appear. Out of the 5,680 results, the overwhelming majorities are not relevant and often times the best covers end up not being viewed by the searcher because of their low placement in the search results.

Accordingly, it would be useful to be able to provide a web-enabled venue or other interface that allows a person to more easily search for items of media (e.g., covers of a particular song). It would also be useful to be able to improve the capability of a web-enabled venue or other interface to navigate, search or browse for items of media, such as songs and videos.

SUMMARY OF THE INVENTION

In an example embodiment, a method for improving media search capability includes providing a user with access to an interface that allows the user to provide one or more inputs relating to an item of media (such as an audio or video recording of a song or a cover song), performing a media search in response to the one or more inputs, and presenting search results via an interactive display generated depending upon media ratings, wherein one or more of the media ratings is determined from media ratings inputs depending upon one or more metrics associated with sources or providers of the media ratings inputs.

DISCLOSURE OF INVENTION

Example embodiments described herein involve methods and technologies for facilitating media search capability in which media search results are provided in a manner responsive to particular actions of consumers of media and/or creators or providers of media. Example embodiments of the methods and technologies described herein facilitate enhanced media search capability and provide or present media search results in a manner responsive to metrics or other information associated with sources or providers of media ratings inputs and/or creators or providers of media.

In example embodiments, methods and technologies for improving media search capability facilitate presentations of media search results responsive to metrics or other information associated with a source or provider of an item of media. In other example embodiments, methods and technologies for improving media search capability facilitate presentations of media search results responsive to metrics or other information associated with a creator or provider of an item of media.

In an example method for improving media search capability, a network (or other communication means) is utilized to provide user interfaces at personal computing devices, or at other devices capable of generating interfaces (e.g., interactive displays), in response to commands received and/or resources accessed via the network.

Figure 1:
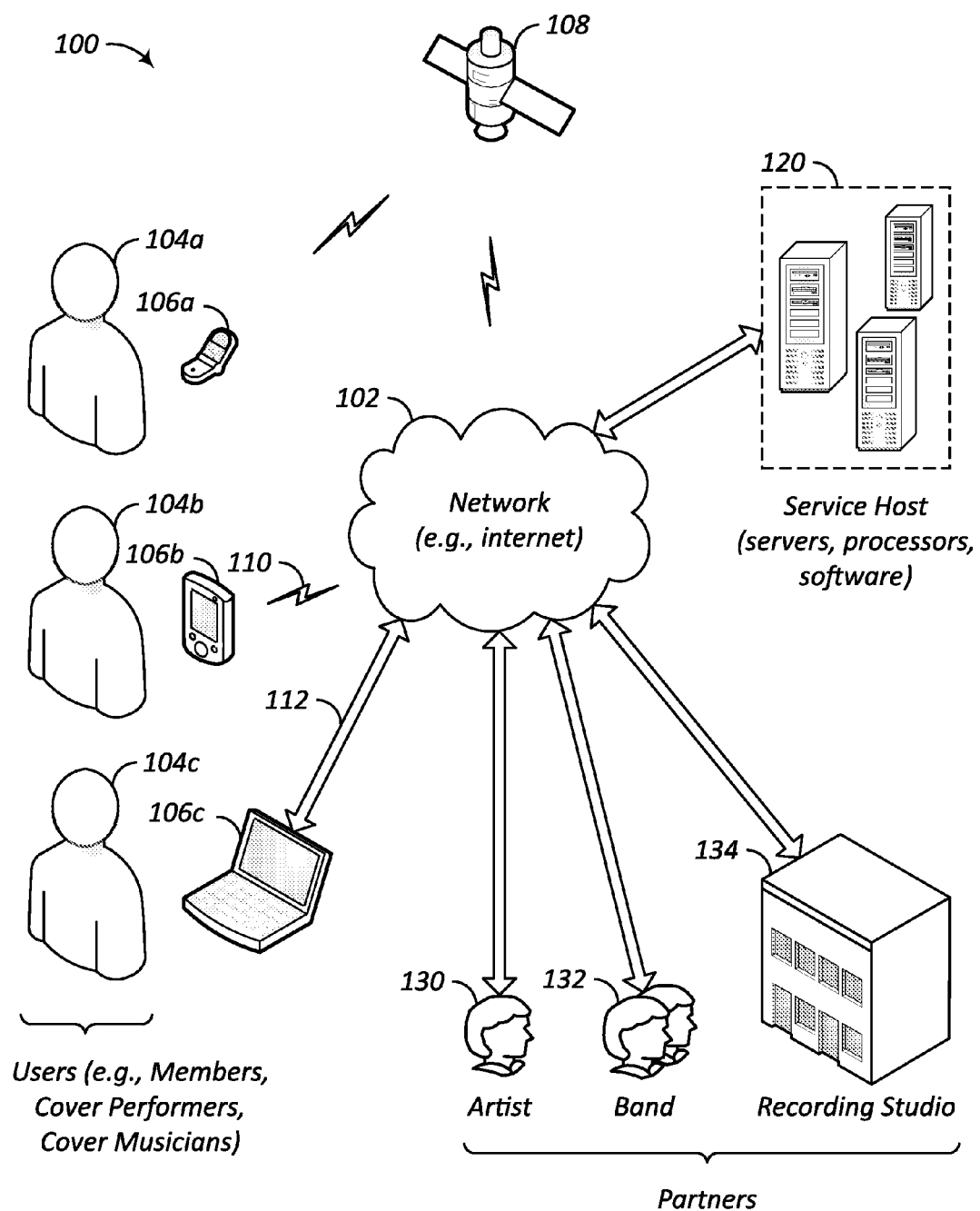
FIG. 1 shows an example implementation of a method for improving media search capability, the example implementation utilizing a network and communications links to provide user interfaces at personal computing devices.

FIG. 1 shows an example implementation 100 of a method for improving media search capability in which a network 102 (e.g., the internet) is utilized to provide user interfaces for users 104a, 104b, and 104c at personal computing devices (PCD) 106a, 106b, and 106c, respectively. In this example, PCD 106a is a mobile telephone configured to communicate with the network 102 via satellite 108, PCD 106b is a tablet computer configured to communicate with the network 102 via a communications path that includes as a portion thereof a wireless communications link 110, and PCD 106c is a notebook computer configured to communicate with the network 102 via a communications path 112 that includes as a portion/portions thereof one or more wireless or wired communications links or a combination of wireless and wired communications links. It should be understood that the personal computing devices described herein are presented as examples of devices capable of generating interfaces (e.g., interactive displays) in response to commands received and/or resources accessed via a network (or other communication means) and that the scope of the invention(s) includes implementations in which other devices are alternatively or additionally utilized to provide interfaces in relation to, or otherwise implement, the methodologies described herein.

The methods and technologies for improving media search capability described herein can be implemented, by way of example, utilizing one or more websites, user interfaces, and/or applications. For example, referring again to FIG. 1, a service host 120 (e.g., implemented in the form of servers, processors, or the like operating under the control of software and/or other sources of commands or inputs) can be configured to utilize a system application or other platform to facilitate media searches and/or sales of items of media, for example, by hosting a website accessible by users via the network 102.

In example embodiments, methods and technologies for improving media search capability are implemented via a website (and/or one or more other resources accessible via a network or otherwise).

In example embodiments, methods and technologies for improving media search capability are implemented as an addition and/or an improvement to an existing website such as YouTube. In an example embodiment, one or more interfaces are generated utilizing a custom plug-in system application which functions as an extension and overlay to an existing system application or other platform that facilitates media searches and/or sales of items of media. It should be understood that the user interfaces described herein can be implemented or provided utilizing a website, an addition and/or an improvement to an existing website, or a resource other than a website, and independent of whether the resource is directly accessible by the user. Furthermore, resources can be distributed with respect to their physical locations and can be controlled, individually or as groups (e.g., shared resources), by one or more service hosts and/or partners of the service host(s).

Referring again to FIG. 1, example methods and technologies for facilitating media search capability involve one or more service host entities and/or one or more partner entities. Entities that can be "partners" of a service host include, for example, artists, bands, and recording studios, denoted by numerals 130, 132, and 134, respectively. It should be appreciated that other entities can also serve as "partners" to one or more service hosts in relation to the methods and technologies described herein. The "users" include, for example, members (e.g., users registered with a particular service host and/or other web-enabled business entity) and performers (e.g., singers of covers of songs, musicians and instrumentalists playing covers), as well as other people. In an example embodiment, a person or entity can be both a "user" and a "partner". In other embodiments, a person/entity participates only as a "user" or only as a "partner".

In example embodiments of the methods and technologies described herein, users are provided with interfaces that facilitate media search and other actions relating to particular items of media, such as covers of songs or parodies of songs, that have been uploaded to the service host 120 and/or other web-enabled resource. A cover of a song (e.g., a video of a cover performance of a song) can be created (e.g., recorded, produced, etc.), for example, by one or more "users" (e.g., by cover performers and/or cover musicians), by one or more "partners" (e.g., by a known, popular, or famous artist or band), or by a collaborative effort involving at least one "user" or "partner". A created item of media can include content from sources other than "users" and "partners" and, in the case of covers (or other performances of songs) can include, for example, content in addition to and/or replacing one or more portions of a "user" and/or "partner" cover performance.

Figure 2:
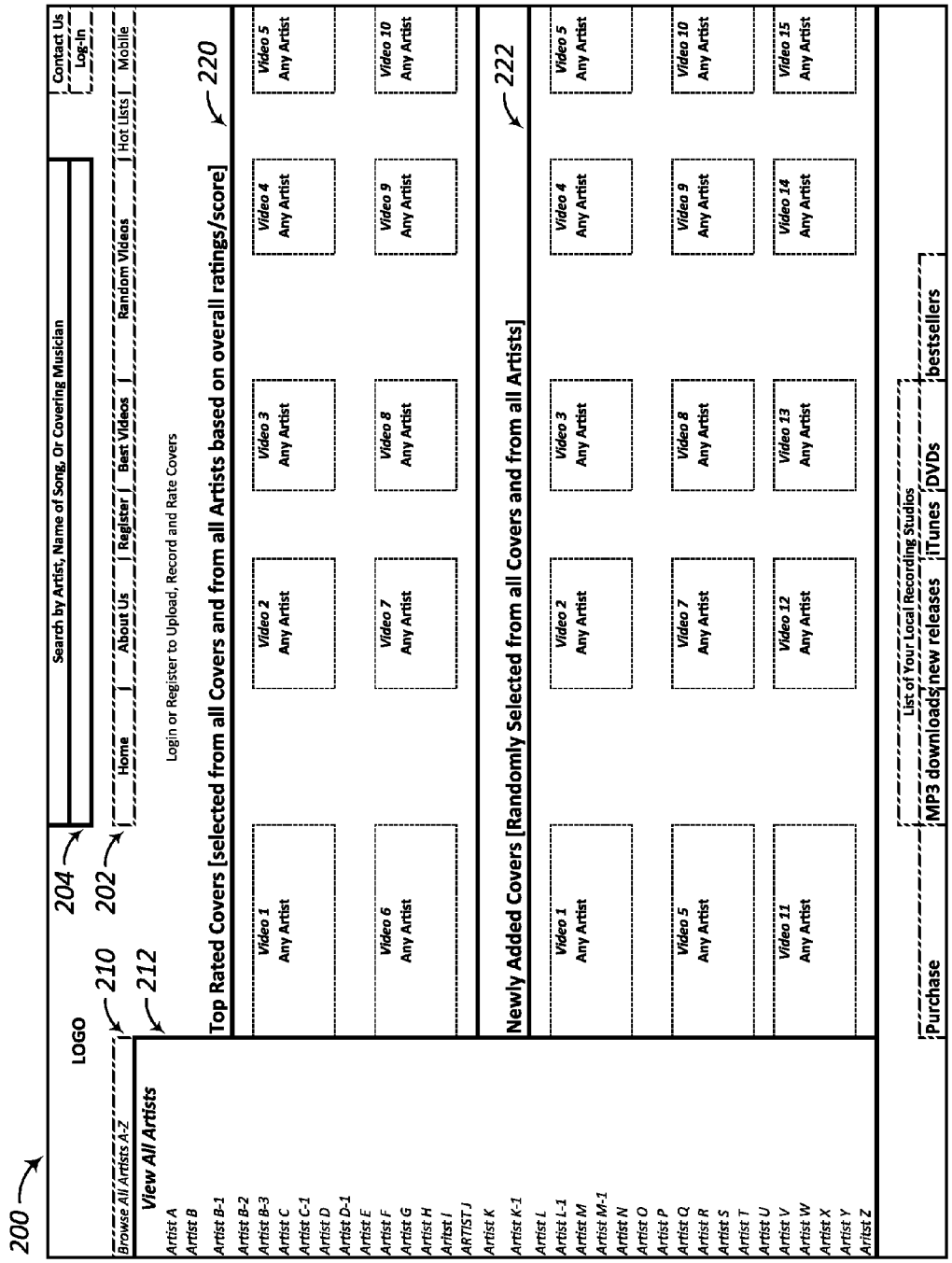
FIG. 2 shows an example interface at which visual representations of items of media are presented and configured such that a user can utilize the interface to select a presented item of media and gain access to a media search resource.

FIG. 2 shows an example interface 200 at which visual representations of items of media are presented and configured such that a user can utilize the interface to select a presented item of media and gain access to a media search resource (e.g., provided by a service host or other web-enabled entity). In example embodiments of the methods and technologies described herein, the visual representations and/or other aspects of the interface pertain to a specific type, form, category, or group of media and can be, but are not necessarily, limited to presentations of a specific type, form, category, or group of media. In this example embodiment, the visual representations as well as other aspects of the interface 200 pertain to items of media of a specific type, form, category, or group, namely, videos of cover performances. In another example embodiment, presented items of media include multiple types of media (e.g., sound recordings and video) of a common category or group (e.g., items of media that are covers or include cover content). In other example embodiments, the visual representations and/or other aspects of the interface pertain to items of media of a different category or group, such as parodies. In another example embodiment, presented items of media include a single type of media (e.g., videos) of multiple categories or groups (e.g., items of media including either covers or parodies).

The interface 200 includes a navigation bar 202 which, in this example embodiment, includes user selectable fields (or buttons) denoted "Home", "About Us", "Register", "Best Videos", "Random Videos", "Hot Lists" and "Mobile". These portions of the interface, when selected by a user, provide a user input that causes the service host, for example, to generate a different display. For example, when a user clicks the "Register" field of the navigation bar 202, the display is controlled to generate a new interface (such as the interface described below in relation to FIG. 6) through which a visitor can register and/or become a member (e.g., with a service host and/or other web-enabled business entity). The "Best Videos" and "Random Videos" buttons of the navigation bar 202, upon selection, provide user inputs that cause the display to be controlled to generate different and/or additional interfaces (e.g., by accessing other webpages and/or resources, generating pop-up displays, etc.) that present, for example, "Top rated Covers in all Categories" and "Randomly Displayed Videos in all Categories", respectively. In this example embodiment, the navigation bar 202 is presented within multiple different interfaces (as shown in the interfaces described herein in relation to FIGS. 2-6).

In example embodiments, the methods and technologies described herein allow a user to search for items of media by entering query terms associated with one or more specific types, forms, categories, or groups of media. Referring again to FIG. 2, in an example implementation, the interface 200 includes a search bar 204 configured to allow a user to search for covers by artist, name of song, or covering musician. To facilitate the foregoing media search functionality, artist, name of song, and covering musician information is associated with uploaded items of media and included as part of a larger database of information utilized, for example, by the service host, to identify covers within the database that match or otherwise associate with the search query and display the results (e.g., by controlling an interface to present visual representations of all covers included in the search results). Moreover, search queries can be automatically associated with the particular interface from which the search query was submitted (e.g., an interface dedicated to covers), thereby potentially reducing the amount of data in the database that needs to be processed or otherwise simplifying media search processing. In this example embodiment, the search bar 204 is presented within multiple different interfaces (as shown in the interfaces described herein in relation to FIGS. 2-6).

The interface 200 includes a field (or button) 210 denoted "Browse All Artists A-Z" which, when selected, causes a portion 212 (of the interface 200) denoted "View All Artists" to present a list of the names of all Artists from A-Z (e.g., a list of famous artists that performed, or are otherwise associated with, the original studio recordings of songs). In an example embodiment, the interface 200 is configured such that selection of a name from the list (e.g., "Artist J") causes the display to be controlled to generate different and/or additional interfaces (e.g., by accessing other webpages and/or resources, generating pop-up displays, etc.) that present, for example, visual representations of the "Covers of Artist J", making it easy and convenient for a user to navigate and locate covers from an original artist.

In example embodiments of the methods and technologies described herein, media search results are presented depending upon media ratings. Referring to FIG. 2, in an example implementation, the interface 200 includes display areas 220 and 222 within which items of media are presented. In this example interface, items of media are presented in the first display area 220 depending upon media ratings, whereas items of media are presented in the second display area 222 independent of media ratings. In an example embodiment, top rated items of media are determined (or identified) depending upon media ratings, and the first display area 220 is utilized to present the top rated items of media (e.g., top rated covers). For example, 10 Top Rated Covers can be randomly displayed from a group of 1,000 of the highest rated covers (e.g., selected from all covers and from all artists based on ratings). In an example embodiment, items of media are randomly selected from a group of media items determined (or identified) independent of media ratings, and the second display area 222 is utilized to present the randomly selected items of media (e.g., randomly selected covers). For example, Newly Added Covers can be randomly displayed (e.g., randomly selected from all covers and from all artists). The randomly selected items of media presented in the second display area 222 can include, for example, only newly or recently added covers of songs. In this example interface, visual representations of the items of media are presented in the display areas 220 and 222, and the interface 200 is configured such that selection of a visual representation causes the display to be controlled to generate different and/or additional interfaces (e.g., by accessing other webpages and/or resources, generating pop-up displays, etc.) that present (e.g., via an interface such as described below in relation to FIG. 5) the item of media and/or resources or information that can be, but are not necessarily, related to the item of media.

In example embodiments, media search results are presented depending upon media ratings, which are determined from media ratings inputs and one or more metrics associated with sources or providers of the media ratings inputs. For example, one or more of the media ratings inputs is assigned a value or weighted depending upon the one or more metrics or information associated with sources or providers of the media ratings inputs.

In example implementations of the methods and technologies described herein, media consumption activities or trends associated with a source or provider of a media rating input are monitored, and one or more metrics associated with the source or provider of a media rating input are adjusted depending upon the media consumption activities or trends. For example, a metric associated with a user who watches a video from beginning to end can be adjusted such that a media rating input (provided by that user) is more heavily weighted than the media rating inputs provided by users who also rated but only watched a portion of said video. Moreover, it should be understood that information or data relating to the media consumption activities or trends (e.g., associated with sources or providers of the media ratings inputs) is not limited to information or data resulting from a process of monitoring or collecting data over time and can be otherwise accessed or acquired.

In example implementations of the methods and technologies described herein, information (or data) associated with a source or provider of a media rating input is accessed, and one or more metrics associated with the source or provider of a media rating input are adjusted depending upon the information (or data). Media consumption information associated with sources or providers of the media ratings inputs can include, for example, one or more of: a percentage of an item of media streamed by the source or provider of the media rating input, a number of items of media accessed by the source or provider of the media rating input, a number of artist-specific items of media accessed by the source or provider of the media rating input, a number of genre-specific items of media accessed by the source or provider of the media rating input, an amount of bandwidth utilized by the source or provider of the media rating input, a history of media consumption activity by the source or provider of the media rating input, an amount of recent media consumption activity by the source or provider of the media rating input, a number of unique pages visited by the source or provider of the media rating input, a number of visits to partner websites by the source or provider of the media rating input, and information regarding media purchases by the source or provider of the media rating input.

Other information associated with sources or providers of the media ratings inputs can include, for example, one or more of: a rating of the source or provider of the media rating input (e.g., provided via a website or other platform through which a visual representation of an item of media identified in the search results is presented), proximity of the source or provider of the media rating input to a location associated with an item of media, a status of the source or provider of the media rating input in relation to a business or other entity involved with providing a website or other platform through which the search results are generated, and information regarding media-related services utilized by the source or provider of the media rating input.

The one or more metrics associated with the source or provider of a media rating can be adjusted depending upon additional and/or alternative information, behaviors, trends, and statuses, or depending upon analytics, determinations, measurements, conditions, commands, overrides, interrupts, requests, responses, and/or inputs, in conjunction with or independent of information, behaviors, trends, and statuses.

In example embodiments, media search results are presented depending upon a media status (e.g., preferred media, featured media, non-preferred media, banned media), which is determined from one or more metrics associated with a creator or provider of an item of media. For example, the media status associated with an item of media is assigned or adjusted depending upon one or more metrics associated with the creator or provider of the item of media.

In example implementations of the methods and technologies described herein, information (or data) associated with a creator or provider of an item of media is accessed, and one or more metrics associated with the creator or provider of an item of media are adjusted depending upon the information (or data). Information (or data) associated with a creator or provider of an item of media can include, for example, one or more of: ratings associated with the creator or provider of an item of media, a status of the creator or provider of an item of media (e.g., in relation to a business or other entity involved with a website or other platform providing a media search interface through which a resource or information facilitating access to the item of media is presented), and information or trends regarding media-related services utilized by the creator or provider of an item of media.

The one or more metrics associated with the creator or provider of an item of media can be adjusted depending upon additional and/or alternative information, behaviors, trends, and statuses, or depending upon analytics, determinations, measurements, conditions, commands, overrides, interrupts, requests, responses, and/or inputs, in conjunction with or independent of information, behaviors, trends, and statuses.

Figure 3:
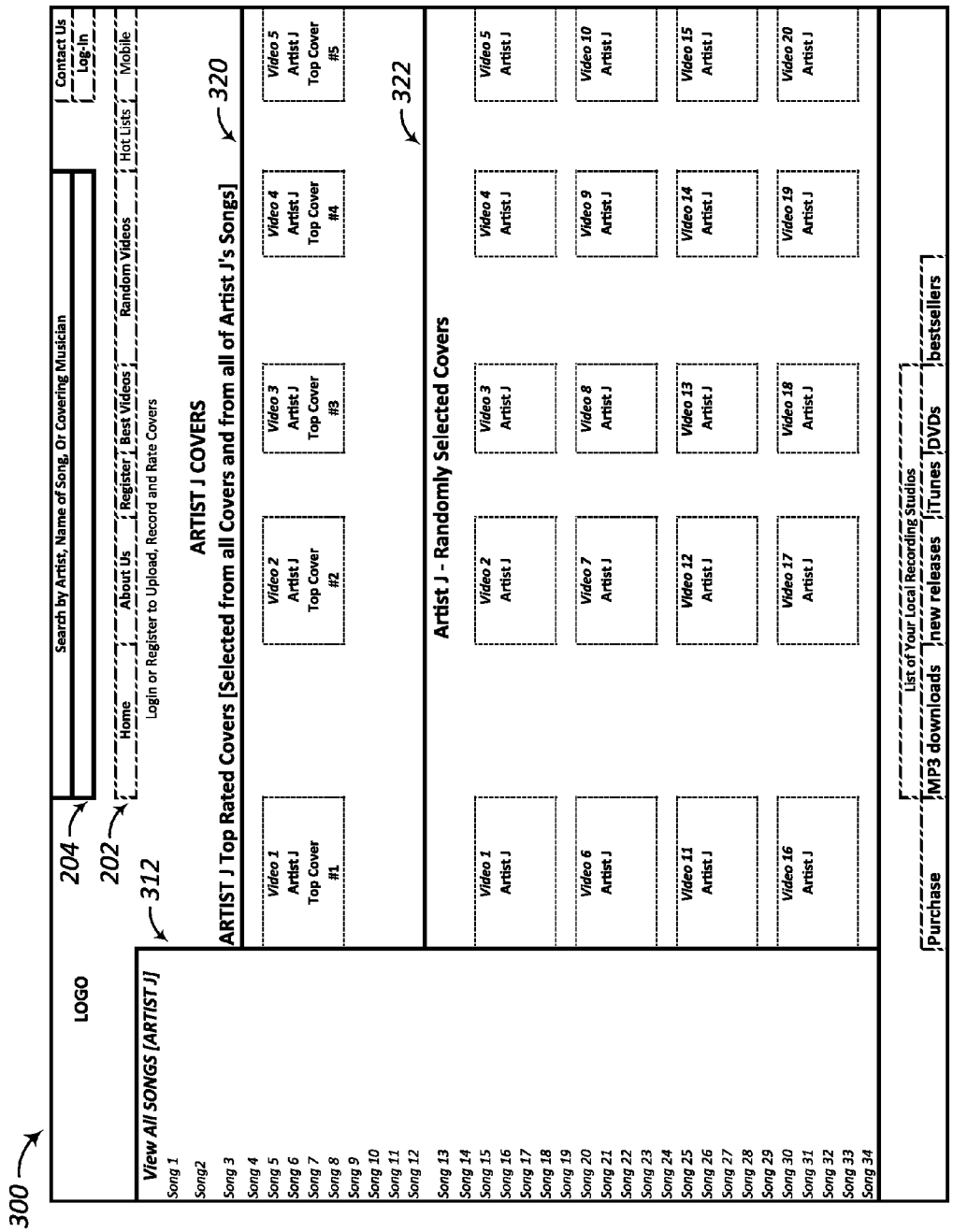
FIG. 3 shows an example interface at which visual representations of "artist-specific" items of media are presented in different areas of the interface depending upon media selection criteria associated with the different areas, respectively.

FIG. 3 shows an example interface 300 at which visual representations of "artist-specific" items of media are presented in different areas of the interface depending upon media selection criteria associated with the different areas, respectively. The interface 300 (denoted "ARTIST J's Home Page", in this example) includes a portion 312 in which songs by the artist (all songs by ARTIST J, in this example) are listed. The interface 300 is presented, for example, in response to a search for a specific artist using the search bar 204.

The interface 300 can be configured to present (e.g., within the portion 312) all songs by a specific artist, for example, 48 songs by ARTIST J. The interface 300 includes display areas 320 and 322 within which "artist-specific" items of media are presented. The interface 300 can be configured to present "artist-specific" items of media for only a single artist or band. In this example, only covers of a specific artist's songs are presented in the display areas 320 and 322, making it easier and more convenient for a user to navigate and locate "artist-specific" covers. In an example embodiment, "artist-specific" top rated items of media are presented in the first display area 320 and include only covers of songs from a specified artist. In an example embodiment, "artist-specific" randomly selected items of media are presented in the second display area 322 and include only covers of songs from a specified artist.

In this example interface, "artist-specific" items of media are presented in the first display area 320 depending upon media ratings, whereas "artist-specific" items of media are presented in the second display area 322 independent of media ratings. In an example embodiment, "artist-specific" top rated items of media are determined (or identified) depending upon media ratings, and the first display area 320 is utilized to present the "artist-specific" top rated items of media (e.g., "artist-specific" top rated covers). For example, if there are 405 covers for the 48 songs by ARTIST J, the 5 highest rated covers of ARTIST J's songs can be displayed (e.g., selected from all covers and from all of ARTIST J's songs based on ratings). In an example embodiment, items of media are randomly selected from an "artist specific" group of media items determined (or identified) independent of media ratings, and the second display area 322 is utilized to present the "artist-specific" randomly selected items of media (e.g., "artist-specific" randomly selected covers). For example, the remaining 400 covers can alternate randomly in their ordering or arrangement (e.g., each time the second display area 322 is presented or refreshed). This provides each item of media with at least some likelihood of being presented at a location on the display likely to attract user attention (regardless of how or whether it has been rated). In this manner, newly added items of media have the potential to more quickly gain notice and, if favorably received, garner high ratings and rise (by virtue of ratings-based merit) to a presentation position within the first display area 320. In addition, this way of organizing and presenting items of media (e.g., covers) allows a website, for example, to more easily create or present contests related to specific artists.

In another example embodiment, an item of media (e.g., an "artist-specific" item of media) is guaranteed a minimum number or percentage of "first page" presentations within a number of display area presentations (e.g., a newly added item of media is guaranteed at least one "first page" presentation per 1,000 presentations of groups of items of media that include the newly added item of media). Regardless, in example implementations, the interface 300 can be configured to permit a user to view all of the "artist specific" items of media in the second display area 322 (e.g., by scrolling downward to view those items less favorably positioned or arranged).

Figure 4:
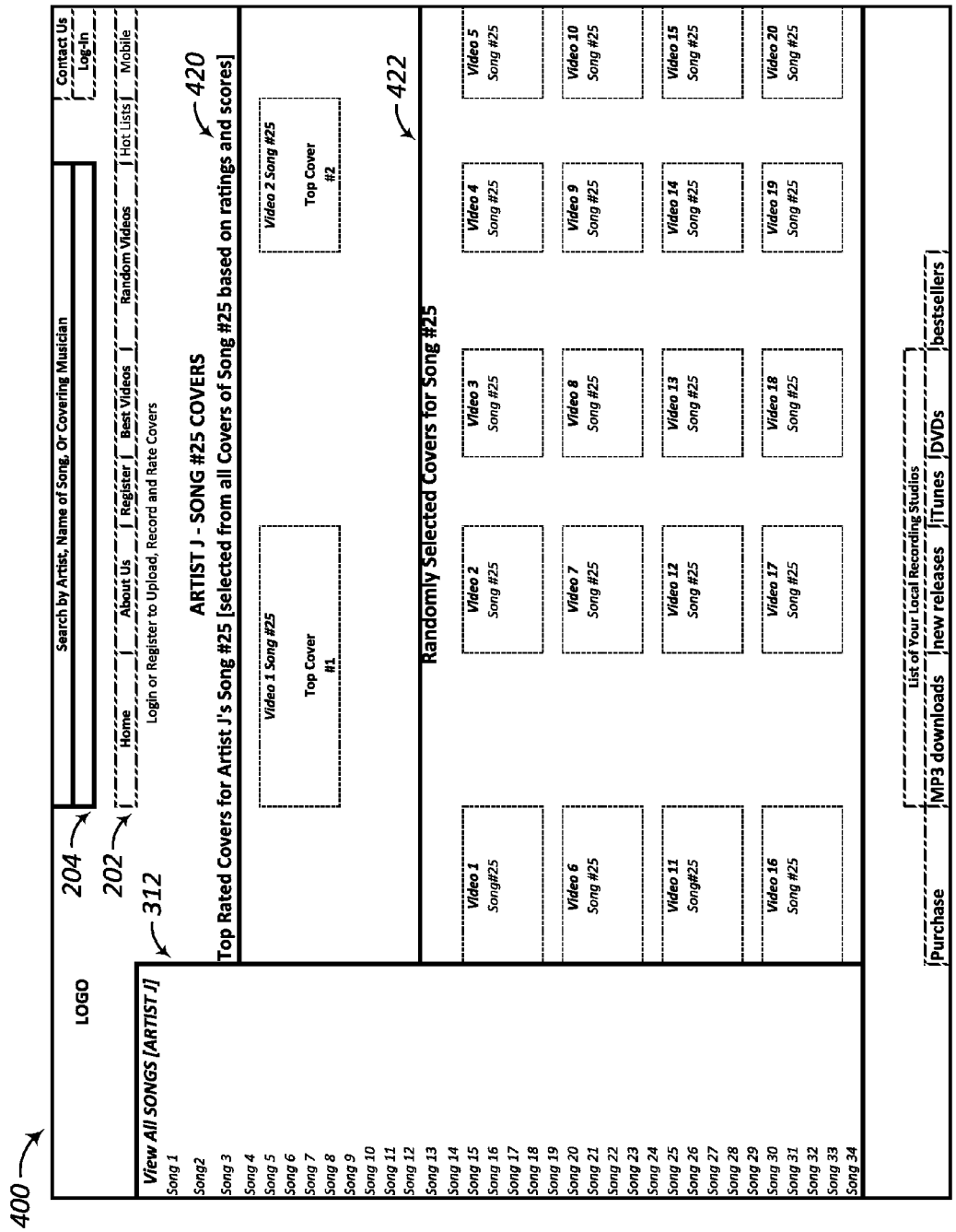
FIG. 4 shows an example interface at which visual representations of "song-specific" items of media are presented in different areas of the interface depending upon media selection criteria associated with the different areas, respectively.

FIG. 4 shows an example interface 400 at which visual representations of "song-specific" items of media are presented in different areas of the interface depending upon media selection criteria associated with the different areas, respectively. The interface 400 (denoted "ARTIST J—SONG #25 COVERS", in this example) also includes the portion 312 in which songs by the artist (all songs by ARTIST J, in this example) are listed. The interface 400 is presented, for example, in response to a search for a specific song using the search bar 204 or the selection of a specific song (e.g., from the portion 312 of interface 300).

The interface 400 includes display areas 420 and 422 within which "song-specific" items of media are presented. The interface 400 can be configured to present "song-specific" items of media for only a single song. In this example, only covers of a specific song are presented in the display areas 420 and 422, making it easier and more convenient for a user to navigate and locate "song-specific" covers. In an example embodiment, "song-specific" top rated items of media are presented in the first display area 420 and include only covers of a specified song. In an example embodiment, "song-specific" randomly selected items of media are presented in the second display area 422 and include only covers of a specified song.

In this example interface, "song-specific" items of media are presented in the first display area 420 depending upon media ratings, whereas "song-specific" items of media are presented in the second display area 422 independent of media ratings. In an example embodiment, "song-specific" top rated items of media are determined (or identified) depending upon media ratings, and the first display area 420 is utilized to present the "song-specific" top rated items of media (e.g., "song-specific" top rated covers). For example, if there are 80 covers of ARTIST J's Song #25, the top two highest rated covers of ARTIST J's Song #25 can be displayed (e.g., selected from all covers of Song #25 based on ratings). In an example embodiment, items of media are randomly selected from a "song-specific" group of media items determined (or identified) independent of media ratings, and the second display area 422 is utilized to present the "song-specific" randomly selected items of media (e.g., "song-specific" randomly selected covers). For example, the remaining covers of ARTIST J's Song #25 can alternate randomly in their ordering or arrangement (e.g., each time the second display area 422 is presented or refreshed). This provides each item of media with at least some likelihood of being presented at a location on the display likely to attract user attention (regardless of how or whether an item of media has been rated). In this manner, newly added items of media have the potential to more quickly gain notice and, if favorably received, garner high ratings and rise (by virtue of ratings-based merit) to a presentation position within the first display area 420. In addition, this way of organizing and presenting items of media (e.g., covers) allows a website or other network- or web-enabled venue, by way of example, to more easily create or present contests related to specific songs.

In another example embodiment, an item of media (e.g., a "song-specific" item of media) is guaranteed a minimum number or percentage of "first page" presentations within a number of display area presentations or presentation events (e.g., a newly added item of media is guaranteed at least one "first page" presentation per 1,000 presentations of groups of items of media that include the newly added item of media). Regardless, in example implementations, the interface 400 can be configured to permit a user to view all of the "song specific" items of media in the second display area 422 (e.g., by scrolling downward to view those items less favorably positioned or arranged).

Figure 5:
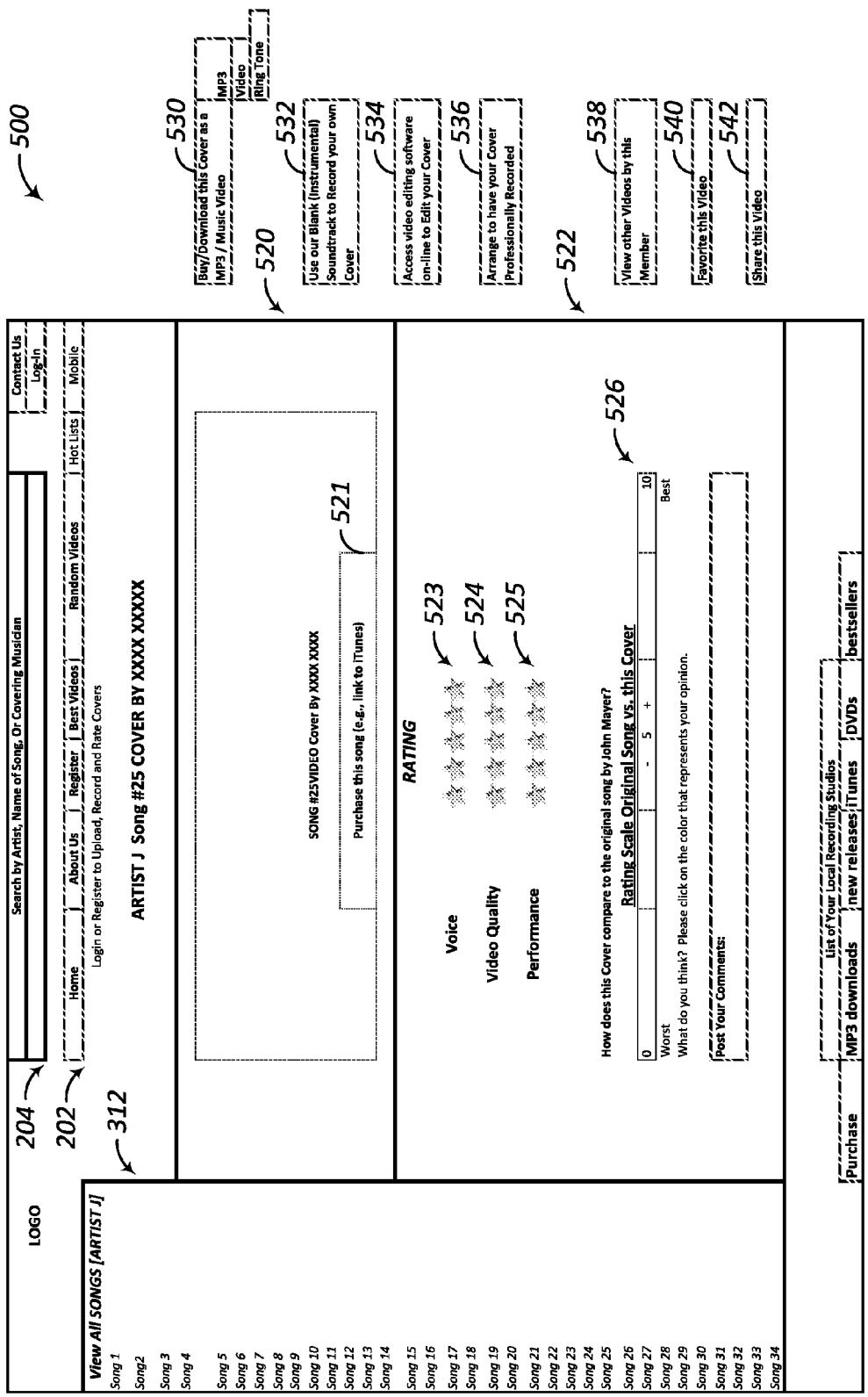
FIG. 5 shows an example interface at which visual representations are presented and configured such that a user can gain access to and provide rating inputs in relation to a selected item of media.

In example embodiments of the methods and technologies described herein a user interface is generated or presented that allows the user to provide one or more ratings inputs for an item of media. FIG. 5 shows an example interface 500 at which visual representations are presented and configured such that a user can gain access to and provide rating inputs in relation to a selected item of media. The interface 500 is presented, for example, in response to the selection of a specific item of media (e.g., a cover selected at interface 400).

The interface 500 includes a display area 520 within which a selected item of media (e.g., a selected cover video) is presented and a display area 522 configured to allow a user to provide media ratings inputs in relation to the selected item of media. The display area 520 presents a selected item of media ("SONG #25 VIDEO Cover by XXXX XXXXX", in this example) and, additionally, includes a field (or button) 521 which, when selected, causes the display to be controlled to generate different and/or additional interfaces (e.g., by accessing other webpages and/or resources, generating pop-up displays, etc.) that present, for example, resources or information that allow the user to purchase the item of media (e.g., a link to iTunes). In an example embodiment, a user interface is generated that prompts the user to purchase an item of media and/or create a virtual album.

Media ratings inputs are provided (e.g., to the service host) when a user selects particular portions of the display area 522. Interactive fields, star-shaped, in this example, are presented and configured to permit a user to rate items of media (and/or artists) according to different criteria. For example, in the case of a cover video, the criteria can include: voice (e.g., how good is the coverer's voice?), video quality (e.g., how good was the quality of the video/sound?), and performance (e.g., did the coverer make the song their own/add their personality?) A user can submit a rating between 1 and 5 stars, for example, for each of the three criteria using interactive fields 523, 524, and 525, respectively. In an example embodiment, a user is free to vote in all, none, or any of the criteria they choose. In other embodiments, whether a user provides media ratings inputs (e.g., in relation to all or multiple criteria) can be monitored for purposes of scaling or applying weights to inputs provided by that user.

In relation to the effect of ratings on the presentation of items of media, one or more of the criteria can be used to determine which of a group of items of media is eligible for top or prominent placement. A minimum number of votes for a particular item of media can also be required as a prerequisite to said item of media being eligible for top or prominent placement.

In an example approach or algorithm for determining a media rating, a score for an item of media is determined by averaging the ratings for each of the criteria. For example, if a cover receives an average of 3.5 in voice, 4.2 in performance, and 4.7 in video quality, it will have a score of 4.13 which can be its media rating. The score can be modified or adjusted depending upon other criteria and/or depending upon metrics or other information associated with sources or providers of media ratings inputs and/or creators or providers of media.

Other approaches or algorithms for determining a media rating take into consideration one of more of the following: an amount or percentage of an item of media listened to or viewed by the user, whether the user has already submitted a particular rating for a particular item of media, and a comparison between the item of media being rated and another item of media. With regard to an amount or percentage of an item of media listened to or viewed by the user, by way of example, if a song is 3 minutes long, and a user listens to it for 1 minute, a rating input submitted by said user would not be carry as high a score as the rating input of a different user who listens to the entirety of the song. For example, the rating input submitted by the user who listened to the song for only 1 minute can be attributed ⅓ of the value of a rating input submitted by a user who listens to the entire song. Moreover, a minimum amount or percentage of an item of media listened to or viewed by the user can be required as a prerequisite to allowing a user to submit a rating in relation to the item of media. For example, a minimum time (e.g., 10 seconds) spent by the user listening to or viewing an item of media can be required before a user is allowed to submit a rating input in relation to the item of media. With regard to whether the user has already submitted a particular rating for a particular item of media, identifying information or data such as an IP address of a user can be tracked or checked against a previously saved address (e.g., to prevent or otherwise take into consideration the submission of redundant ratings by the same user). With regard to a comparison between the item of media being rated and another item of media, the ratings inputs can also include, for example, a comparison of a cover song to the original version of the song. In this example interface, the display area 522 includes a rating bar 526 ranging from zero (0) to ten (10), where the original song is placed in the middle at position five (5). Depending on how a cover compares to the original, a user can click the rating bar 526 to the left or right direction indicating the user's opinion as to whether the cover is better or worse than the original and by what magnitude. For example, a cover that is twice as good as the original can be moved to position ten (10). A cover that is half as good as the original can be moved to position two and one-half (2.5). Different portions of the rating bar 526 can be color coded (e.g., with transitions from one portion to the next occurring ocurring at the locations along the rating bar 526 marked by perforated vertical lines).

The interface 500 (denoted "ARTIST J—SONG #25 COVERS", in this example) also includes the portion 312 in which songs by the artist (all songs by ARTIST J, in this example) are listed. The interface 400 (FIG. 4) is presented, for example, in response to the selection of a specific song from portion 312 of interface 500.

In example embodiments of the methods and technologies described herein, a user interface is generated or presented that prompts the user to take one or more actions. Referring again to FIG. 5, in this example interface, visual representations in the form of pop-up displays 530, 532, 534, 536, 538, 540, and 542 are presented and configured such that a user is prompted to provide one or more additional inputs via the interface. The pop-up displays are generated, for example, in response to inputs provided by the user and/or commands from or provided by the service host.

The pop-up display 530 (denoted "Buy/Download this Cover as a MP3/Music Video"), when selected by a user, causes a different and/or additional interface to be generated presenting, for example, resources or information that allow the user to purchase or download audio, video or ring tone items of media (e.g., directly from a website of the service host, or from a partner entity).

The pop-up display 532 (denoted "Use our Blank (Instrumental) Soundtrack to Record your own Cover"), when selected by a user, cause a different and/or additional interface to be generated presenting, for example, resources or information that allow the user to use an instrumental soundtrack to record a cover song. In an example embodiment, a webpage or other interface is configured to provide a user with access to soundtracks (e.g., the soundtracks of all songs by all artists, or some other selection or group of song soundtracks), which will potentially simplify, especially for amateur and/or upcoming artists/singers/musicians, the process of creating and uploading covers. In example embodiments, one or more interfaces are presented and configured to allow a user with a webcam/video camera to use instrumental or blank soundtracks and video shot or captured with the webcam/video camera to create and upload a cover (e.g., to a website hosted by, or partnered or associated with, the service host).

The pop-up display 534 (denoted "Access video editing software on-line to Edit your Cover"), when selected by a user, cause a different and/or additional interface to be generated presenting, for example, resources or information that allow the user to access video editing software on-line to edit a cover song. In an example embodiment, a webpage or other interface is configured to provide a user with access to one or more software programs that allow the user to perform video editing tasks. For example, a user is provided with access to video editing tools embodying a combination of features/functionalities sufficient for creating covers from scratch.

The pop-up display 536 (denoted "Arrange to have your Cover Professionally Recorded"), when selected by a user, cause a different and/or additional interface to be generated presenting, for example, resources or information that allow the user to arrange to have a cover song professionally recorded. For example, the user is provided with access to a list of nationwide professional recording studios. Alternatively, a geographically limited or bounded list can be provided (e.g., professional recording studios within 5, 10, 20 or 100 miles of a particular or specified location). Example implementations of the methods and technologies described herein involve arranging (or providing the user with access to a service that arranges) for a cover to be professionally recorded at a recording studio.

The pop-up displays 538, 540, 542 (denoted "View other Videos by this Member", "Favorite this Video", and "Share this Video", respectively) perform their respective described functionalities, e.g., in conventional fashion and/or as otherwise described herein.

Figure 6:
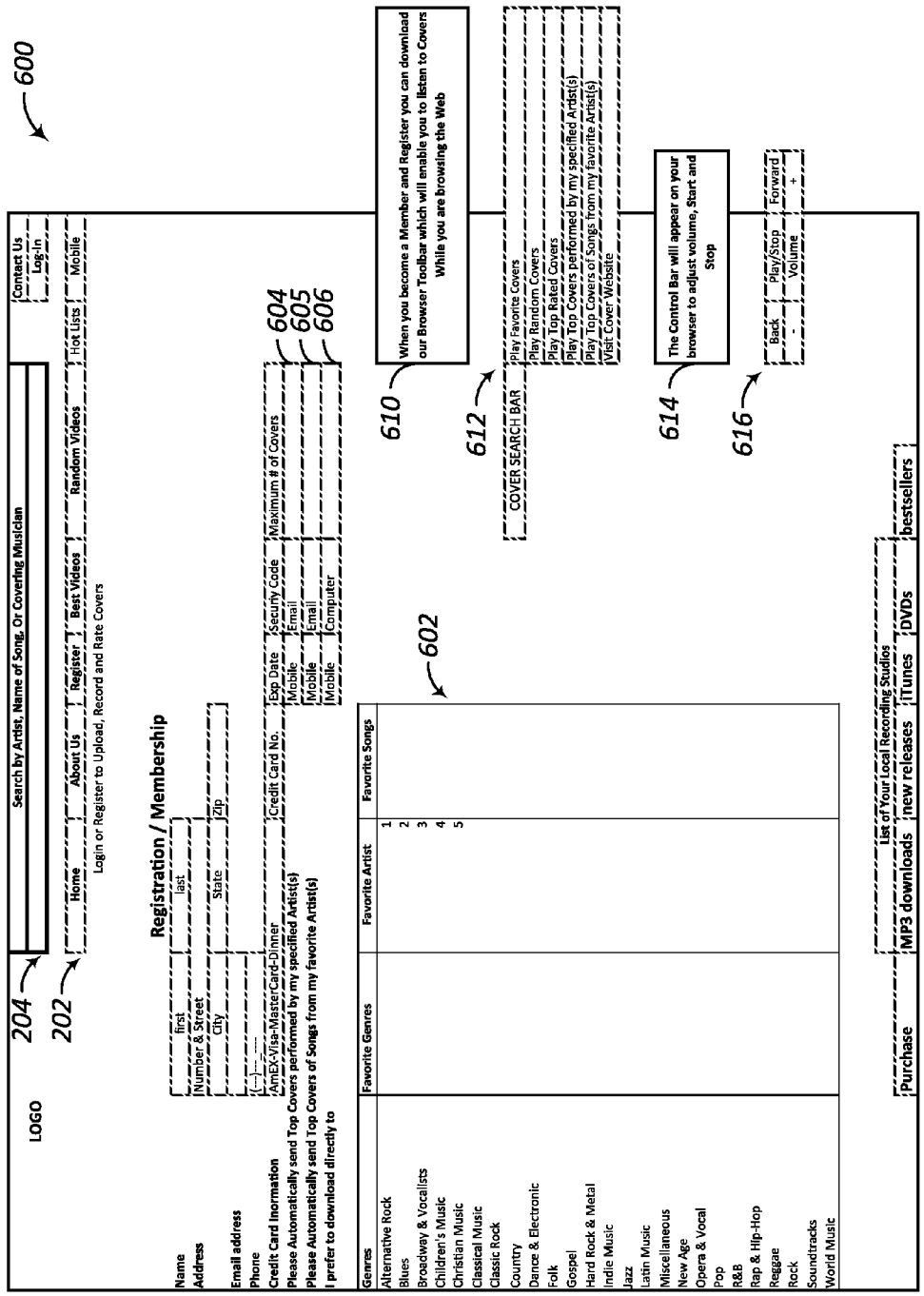
FIG. 6 shows an example interface configured to allow a user to designate parameters for controlling an automated process of downloading specified media to specified destinations or devices.

FIG. 6 shows an example interface 600 (denoted "Registration/Membership") which is presented, for example, in response to the selection of the "Register" field of the navigation bar 202 from any of the previously described interfaces. As shown in this example, the interface 600 can include fields for entering Name, Address, Email address, Phone, Credit Card information as may be requested/required by a service host and/or partner entity in order to register a user. For example, a website or other interface is presented and configured to allow a visitor to join in as a member by registering their information which will be kept confidential.

In example implementations of the methods and technologies described herein, an interface is presented and configured to allow a user to provide inputs relating to items of media that the user is interested in. To this end, the interface 600 includes a portion 602 with columns denoted "Genres", "Favorite Genres", "Favorite Artists", and "Favorite Songs" configured to allow a user to identify (select) favorite genres and list favorite artists and songs. For example, a favorite song is added to the "Favorite Songs" column in response to selection of the pop-up display 540 (FIG. 5). In example embodiments, the service host and/or a partner entity utilizes user selections and information provided (e.g., via portion 602) to notify the user (e.g., by e-mail or text message) of items of media that may be of interest, such as recent top rated covers by favorite artists of the user or recent top rated covers of favorite songs of the user.

The interface 600 additionally includes input field portions 604, 605, and 606 configured to allow a user to designate parameters for controlling an automated process of downloading specified media to specified destinations or devices. The parameters can include, by way of example, a maximum number of items of a specified group of media to be downloaded to a specified destination or device. The parameters can be used to limit download activity associated with media download processes that automatically download items of media (e.g., no user input required to initiate a download) as well as processes that require a user to manually or otherwise provide an input in order for the media download to begin.

In this example, the interface 600 is configured to allow a user to indicate, using the input field portion 604, a maximum number of Top Covers performed by specified Artist(s) that are to be automatically downloaded to destinations or devices specified by the user. The interface 600 is also configured to allow a user to indicate, using the input field portion 605, a maximum number of Top Covers of songs performed by the user's favorite Artist(s) that are to be automatically downloaded to destinations or devices specified by the user. Input fields (denoted "Mobile" and "Email"), adjacent to both the input field portions 604 and 605 as shown, are configured to allow the user to specify destination(s)/device(s) to which the specified items are media are to be downloaded. Alternatively, information allowing or an invitation inviting a user to download the specified items of media can be automatically sent to the specified destination(s)/device(s).

The interface 600 is also configured to allow a user to indicate, using the input field portion 606, a maximum number of Covers that are to be downloaded directly to destinations or devices specified by the user. Input fields (denoted "Mobile" and "Computer"), adjacent to the input field portion 606 as shown, is configured to allow the user to specify destination(s)/device(s) to which items are media are to be downloaded. In an example embodiment, the items of media downloaded are limited to items selected based on inputs and information provided by the user. In other embodiments, the items of media can be selected exclusively, in part, or intermittently by the service host and/or partner entity.

Further with regard to the navigation bar 202, the user selectable field (or button) denoted "Hot Lists" is configured, in an example embodiment, to allow a user (e.g., a member) to view their favorite songs. For example, selection of "Hot Lists" by a user causes an interface to present or generate the portion 602. In an example embodiment, selection of "Hot Lists" also initiates a process of automatically transmitting items of media, e.g., Top Covers performed by specified Artist(s) and Top Covers of songs performed by the user's favorite Artist(s), as previously discussed.

In an example embodiment, selection of the field (or button) denoted "Mobile" causes a webpage or other interface to be presented providing information to the user regarding a mobile registration/membership. Interfaces can also be configured such that selection of "Mobile" causes a webpage or other interface to be presented that allows the user to download items of media (e.g., covers) to their mobile telephone (or PDC).

In example implementations of the methods and technologies described herein, a user interface is generated that prompts the user to become a member and/or register and offers a search bar, tool bar or other add-on as an incentive. To this end, the interface 600 is controlled to generate (e.g., after a user/non-member has viewed the interface for a particular amount of time) displays presenting prompts, information, and/or visual representations designed to incentivize a user into registering with or becoming a member of, by way of example, a website or other network- or web-enabled venue associated with a service host or partner entity thereof. For example, a pop-up display 610 includes text informing a user of the advantages of becoming a member/registering and offering an incentive to the user for taking this action. In this example, the incentive offered is a program download (e.g., add-on) that provides, upon installation, a browser toolbar that allows the user to listen to covers while browsing the internet. A pop-up display 612 provides a visual representation of the browser tool bar (or other incentive program or add-on), as it would appear during operation. In this example, the browser tool bar includes, as shown, a "COVER SEARCH BAR" and user-selectable drop down menu elements denoted, from top to bottom, "Play Favorite Covers", "Play Random Covers", "Play Top Rated Covers", "Play Top Covers performed by my specified Artist(s)", "Play Top Covers of Songs from my favorite Artist(s), and "Visit Cover Website", reflecting the functionalities that they respectively provide. A pop-up display 614 includes text providing a user with information about a control bar that will also appear on the user's browser, allowing the user to adjust volume and start and stop play. An accompanying pop-up display 616 provides a visual representation of the control bar which also allows the user to fast forward or reverse play. Multiple incentives can be presented, for example, either in a burst (e.g., all at once) or spread out over time (e.g., sequentially).

Figure 7:
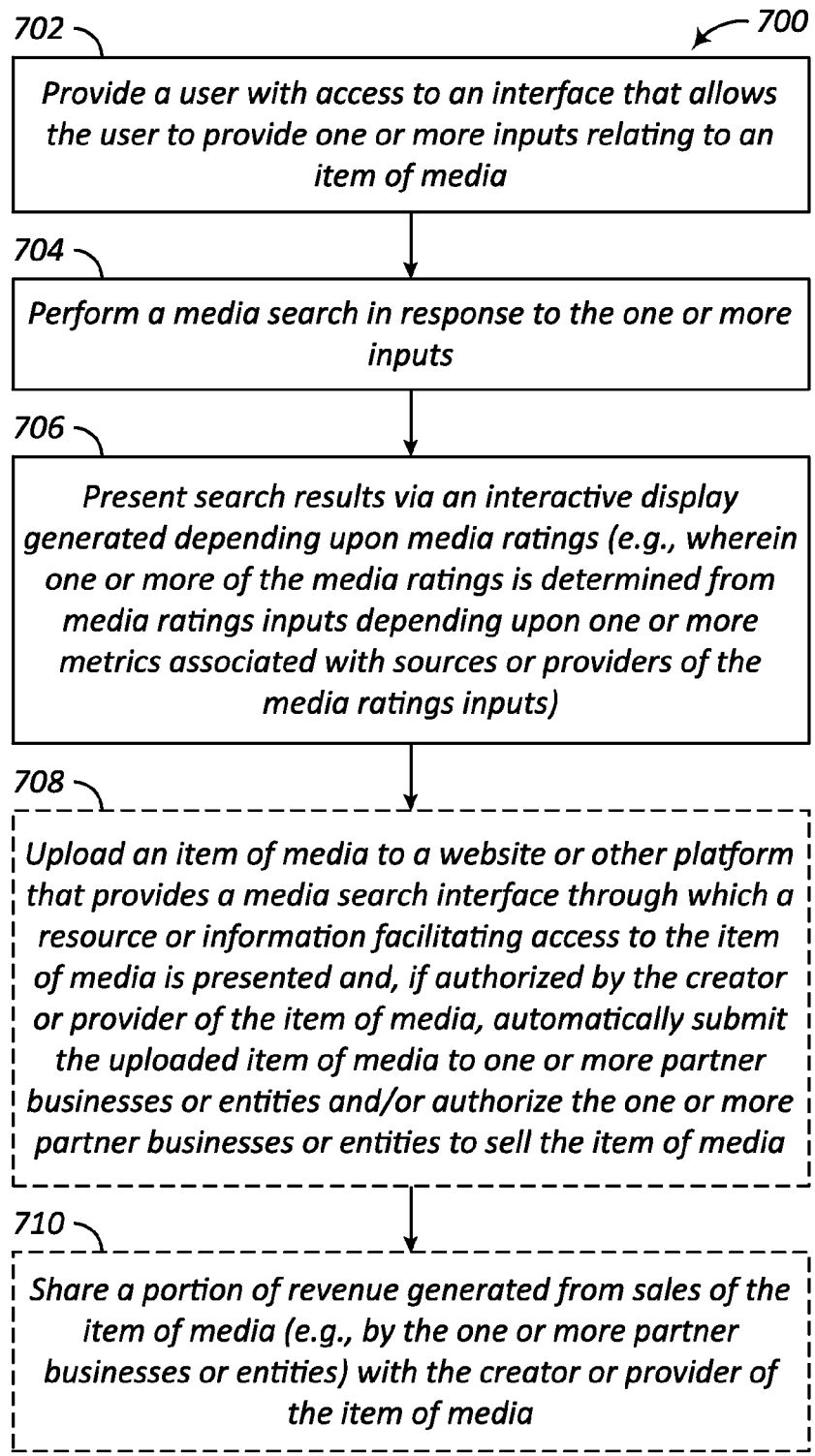
FIG. 7 is a flow chart in accordance with an example method for providing improving media search capability.

Referring to FIG. 7, an example method 700 for providing improving media search capability includes, at 702, providing a user with access to an interface that allows the user to provide one or more inputs relating to an item of media. The method 700 further includes, at 704, performing a media search in response to the one or more inputs and, at 706, presenting search results via an interactive display generated depending upon media ratings, wherein one or more of the media ratings is determined from media ratings inputs depending upon one or more metrics associated with sources or providers of the media ratings inputs. Optionally, at 708 (as denoted with dashed lines), in an example embodiment, the method 700 further includes uploading an item of media to a website or other platform that provides a media search interface through which a resource or information facilitating access to the item of media is presented and, if authorized by the creator or provider of the item of media, automatically submitting the uploaded item of media to one or more partner businesses or entities and/or authorizing the one or more partner businesses or entities to sell the item of media. By way of example, items of media such a covers and parodies uploaded to a website (e.g., associated with the service host or a partner entity thereof) are automatically provided or submitted to a seller of music (e.g., the iTunes Store). Optionally, at 710 (as denoted with dashed lines), in an example embodiment, the method 700 further includes sharing a portion of revenue generated from sales of the item of media (e.g., by the one or more partner businesses or entities) with the creator or provider of the item of media. For example, the service host or a partner entity thereof shares revenue generated from sales and/or downloads (e.g., through their website), which provides an additional incentive for performers, musicians, and other users to post their covers and other items of media.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A method for improving media search capability, the method comprising:
   providing a user with access to an interface that allows the user to provide one or more inputs relating to an item of media;
   performing a media search in response to the one or more inputs;
   utilizing a network to provide user interfaces, responsive to commands received and/or resources accessed via the network, including a display controlled to present visual representations of search results generated depending upon media ratings, one or more of the media ratings being determined from media ratings inputs depending upon one or more metrics associated with sources or providers of the media ratings inputs;
   accessing media consumption information associated with a source or provider of a media rating input, the media consumption information including a percentage of an item of media streamed by the source or provider of the media rating input; and adjusting one or more metrics associated with the source or provider of a media rating input depending upon the media consumption information.

2. The method of claim 1, wherein one or more of the media ratings inputs is assigned a value or weighted depending upon the one or more metrics associated with sources or providers of the media ratings inputs.

3. The method of claim 1, further comprising:
monitoring media consumption activities or trends associated with a source or provider of a media rating input; and
adjusting one or more metrics associated with the source or provider of a media rating input depending upon the media consumption activities or trends.

4. The method of claim 1, further comprising:
accessing information associated with a source or provider of a media rating input; and
adjusting one or more metrics associated with the source or provider of a media rating input depending upon the information.

5. The method of claim 4, wherein:
the information includes one or more of
  a rating of the source or provider of the media rating input,
  proximity of the source or provider of the media rating input to a location associated with an item of media,
  a status of the source or provider of the media rating input in relation to a business or other entity involved with providing a website or other platform through which the search results are generated, and
  information regarding media-related services utilized by the source or provider of the media rating input.

6. The method of claim 1, further comprising:
generating a user interface that allows the user to provide one or more ratings inputs for an item of media, the one or more ratings inputs each representing different criteria by which the user can rate the item of media, the criteria including one or more of
voice,
video quality, and
performance.

7. The method of claim 1, further comprising:
generating a user interface that allows the user to provide one or more ratings inputs for an item of media;
wherein the item of media is a cover song and the one or more ratings inputs include a comparison of the cover song to the original version of the song.

8. The method of claim 1, further comprising:
generating a user interface that prompts the user to become a member and/or register and offers a search bar, tool bar or other add-on as an incentive.

9. The method of claim 1, further comprising:
generating a user interface that prompts the user to take one or more of the following actions
  purchasing an item of media,
  creating a virtual album,
  using an instrumental soundtrack to record a cover song,
  accessing video editing software on-line to edit a cover song, and
  arranging to have a cover song professionally recorded.

10. A method for improving media search capability, the method comprising:
providing a user with access to an interface that allows the user to provide one or more inputs relating to an item of media;
performing a media search in response to the one or more inputs;
utilizing a network to provide user interfaces, responsive to commands received and/or resources accessed via the network, including a display controlled to present visual representations of search results generated depending upon media ratings, one or more of the media ratings being determined from media ratings inputs depending upon one or more metrics associated with sources or providers of the media ratings inputs;
determining top rated items of media depending upon the media ratings, the top rated items of media being covers of songs;
generating a first display area presenting the top rated items of media, the top rated items of media presented in the first display area including only covers of a specified song;
randomly selecting items of media from a group of media items determined independent of the media ratings, the randomly selected items of media being covers of songs; and
generating a second display area presenting the randomly selected items of media, the randomly selected items of media presented in the second display area including only covers of the specified song.

11. The method of claim 10, wherein the randomly selected items of media presented in the second display area include only newly or recently added covers of the specified song.

12. A method for improving media search capability, the method comprising:
providing a user with access to an interface that allows the user to provide one or more inputs relating to an item of media;
performing a media search in response to the one or more inputs;
controlling a display to provide visual representations of search results generated depending upon media ratings, one or more of the media ratings being determined from media ratings inputs depending upon one or more metrics associated with sources or providers of the media ratings inputs;
accessing media consumption information associated with a source or provider of a media rating input, the media consumption information including a percentage of an item of media streamed by the source or provider of the media rating input; and
adjusting one or more metrics associated with the source or provider of a media rating input depending upon the media consumption information;
wherein the interface is generated utilizing a custom plug-in system application which functions as an extension and overlay to an existing third party system application or other platform that facilitates media searches and/or sales of items of media.

* * * * *